United States Patent
Weinstein

(12) 
(10) Patent No.: US 6,355,144 B1
(45) Date of Patent: Mar. 12, 2002

(54) HIGH OUTPUT SOLAR WATER DISTILLATION SYSTEM

(76) Inventor: Leonard Murrey Weinstein, 13 Burke Ave., Newport News, VA (US) 23601

(*) Notice: Subject to any disclaimer, the term of this patent is extended or adjusted under 35 U.S.C. 154(b) by 0 days.

(21) Appl. No.: 09/261,318

(22) Filed: Mar. 3, 1999

Related U.S. Application Data

(60) Provisional application No. 60/076,926, filed on Mar. 5, 1998.

(51) Int. Cl.[7] .............................. B01D 3/02; C02F 1/14
(52) U.S. Cl. ................... 202/234; 159/DIG. 8; 159/DIG. 15; 159/DIG. 20; 159/DIG. 23; 159/903; 202/174; 202/267.1
(58) Field of Search .................. 203/10, 11, DIG. 1, 203/DIG. 17, 100; 159/DIG. 20, DIG. 8, 903, DIG. 23, DIG. 15; 202/234, 174, 267.1

(56) References Cited

U.S. PATENT DOCUMENTS

| | | | | |
|---|---|---|---|---|
| 3,257,291 A | * | 6/1966 | Gerber | 202/234 |
| 4,178,715 A | * | 12/1979 | Greenbaum | 47/58 |
| 4,276,122 A | * | 6/1981 | Snyder | 203/10 |
| 4,504,362 A | * | 3/1985 | Kruse | 203/11 |
| 5,156,706 A | * | 10/1992 | Sephton | 159/901 |
| 5,853,549 A | * | 12/1998 | Sephton | 203/DIG. 8 |
| 6,124,980 A | * | 9/2000 | Cerbell | 359/665 |

OTHER PUBLICATIONS

Hay, "V. Cover Solar Stills", Sun at work, 2nd quarter, 1966*

* cited by examiner

*Primary Examiner*—Virginia Manoharan

(57) ABSTRACT

A high output solar fluid distillation system is described that is practical to manufacture and efficient to operate, and can distill a variety of fluids such as water or ethyl alcohol. The distillation system uses a fluid feed system that collects source fluid and adds surfactant to improve wetting properties of the source fluid, and uniformly feeds the fluid to the evaporator. Uniquely designed multiple effect chambers expose the source fluid to multiple solar flux effects to condense a portion of the source fluid into distilled fluid. A fluid drain system separates the distilled fluid from the source fluid, while a front cooling mechanism removes external energy from the distillation by a combination of evaporation, convection and radiation. The resulting distillation system overcomes the high cost and complexity of present high performance solar distillation devices and produces more fluid per cost than low-tech versions.

10 Claims, 5 Drawing Sheets

HIGH OUTPUT SOLAR WATER DISTILLATION SYSTEM

The following application claims the benefit of prior filed copending provisional application No. 60/076,926 filed Mar. 5, 1998.

BACKGROUND OF THE INVENTION

1. Field of the Invention

The present invention relates generally to solar distillation systems. More particularly, the present invention relates to a high output solar distillation system that is practical to manufacture and efficient to operate.

2. Discussion of the Related Art

Most fresh water is obtained from rivers or lakes fed by rain or melting ice. When sufficient fresh water is not available; processes using thermal powered water distillation or pressure driven reverse osmosis are often used to convert brackish or salty water to pure water. These processes are expensive to set up and operate. They are less economical and often impractical for very small-scale versions.

Use of the sun to evaporate water, and use of glass or plastic covers to contain and condense the vapor has been long known. Nevertheless, only limited versions of such systems are currently in use. One major problem of previous versions of such systems was the limited amount of water that could be produced in a given area. This resulted in very extensive areas being required for reasonable production levels, and this contributed to the cost and maintenance requirements.

The solar flux is about 1.4 kW/m$^2$ at the earth's location. Just under 1.0 kW/m$^2$ reaches the ground at midday on a clear day and with a high sun angle, due to atmospheric losses. The effective daily total solar flux to a collector depends on the inclination of the collector, amount of clouds, seas, etc. The following discussion relates to a solar collector design, which uses stationary collectors inclined at an angle close to the average latitude angle, and facing the average noon sun. For this case, the maximum total effective daily solar flux is about 8 kW hours/m$^2$/day. For most of the United States, the year round average is approximately 5 kW hours/m$^2$/day. This energy can be used to evaporate water for purification.

Conventional single stage solar evaporator systems are constructed as enclosed structures that pass sunlight in through a sloping glass or plastic wall, have a dark floor covered with a thin layer of source water, and use radiative, convective, and conductive heat transfer to and through the glass to the outside air. The tilt of the wall is required to drain the condensate to collectors. About 92% of sunlight energy pass through the glass sheet, and the dark floor absorbs about 90% of the remainder. The energy raises the water temperature above the outside temperature. Since the glass is cooler than the water, the water vapor condenses on the underside of the glass surface and drains down to the collector. The absorption and heating effectively converts short wavelength sunlight to long wavelength radiation, much of which is trapped in the enclosure due to the spectral response of the glass. This phenomenon is commonly known as the greenhouse effect. Radiation from the heated water to the condenser surface, and the energy used to raise the water temperature above ambient temperature decreases the available energy, so that the effective energy to evaporate the water is typically only about 60% of the total. Glass is normally preferred to plastic for these types of systems due to the better wetting characteristics of glass. If plastic is used, the tilt angle and average drain distances are limited to a smaller range to avoid drops falling from the sheet. Glass is also more scratch resistant and lasts longer in sunlight than plastic. Plastic is sometimes the better choice, however, if its limitations are not overly restrictive, due to its lower weight and greater break resistance, and also due to its ability to be fabricated in complex shapes.

When the water is heated, some of it evaporates, and this removes about 540 cal/g of energy from the remaining water. It therefore requires 2.38 kW hours to evaporate 1 gallon of water at constant temperature. This means that the maximum of approximately 4.8 kW hours/m$^2$/day that is available could evaporate up to 2.02 gallons per day, with a maximum year-round United States average of about 1.26 gallons per day. Due to other system losses such as heat conduction (including through the edge and backside), convective heat losses, and thermal capacity of excess supply water, the best single effect systems actually produce a peak of about 1.2 gallons/m$^2$/day and an average of about 0.8 gallons/m$^2$/day. Even these levels require a fairly high solar flux region.

The main limitation with the above single effect system is that all of the sunlight energy available goes to heat the water one time, overcome the heat of vaporization, and then the system dumps all of this energy into the air in order to cool and condense the vapor out. This process has very poor thermal efficiency.

Use of multiple effect systems can improve the production over single effect systems. The heat of vaporization used for one stage is recovered during condensation of the distillate and passed on to the next stage closer to the external surface. This multi-stage regeneration process, driven by a continual temperature drop stage to stage, can multiply the pure water production. Reflection, refraction, and scattering of the incoming light from each partition drops the energy reaching the darkened absorbing surface beneath the last partition more than for a single effect version, so the maximum distillate production per effect is decreased. The maximum total production in such a process is also limited by the higher temperatures obtained with such systems. The total production for practical multiple effect systems, however, can greatly exceed single effect systems. Unfortunately, previous versions of multiple effect solar distillation systems are either too inefficient or too complex or costly to be of practical use.

SUMMARY OF THE INVENTION

The solar distillation system of the present invention is capable of significantly greater production per area, with an easily installed and maintained structure. The new design can be moved easily, and is practical in small or large-scale systems. The new solar distillation system results in economical purification of water at all scales of operation. In addition, the system can be used to distill other liquids such as ethyl alcohol.

The present approach uses inclined parallel partition surfaces that are spaced a very short vertical distance apart, so that a very compact and strong panel structure results. The small distance between partitions results in diffusion being a major mode of water vapor transport within the chambers. This also results in a minimum temperature drop per stage to achieve the desired level of water vapor diffusion. It should be noted that most previous versions in the literature used fairly large spacing, and this was a major cause of low efficiency. The input sunlight has to pass through all of the partitions to the heat absorbing bottom layer. An insulation sheet is used behind the dark absorbing layer to maximize the energy used to heat the water. As in the single effect system, the usable solar flux energy available is considerably less than 1 kW/m$^2$.

If a 3 effect is used as an example, the maximum available absorbed energy is estimated to be about 450 W/m$^2$ due to additional wall reflection, refraction, and scattering. The maximum temperature of this lower layer depends on the outside temperature, but is typically below 160 degrees F. This energy first evaporates supply water from the bottom of the lowest effect chamber. Since the temperature drops continually from the heat absorber to the exterior, some water condenses on the upper surface of the lowest effect chamber. This condensation gives the 540 cal/g due to the heat of vaporization back to the partition. Water is also run down the top of the second partition, and this water absorbs this energy of condensation. Since the temperature of the second partition is still reasonably high (but lower than the lowest partition), water evaporates from the second partition, and is condensed at the third partition up. The same process continues to the final partition, which now dumps the energy into the surrounding air. If the outer surface is dry, convection and radiation remove the energy. If an external water stream is used on the outer surface, some of the external energy is removed by evaporation. Evaporation insures maximum cooling, even when the exterior air speed is very low. This also lowers the overall device temperature, and also increases light transmission of the surface when it becomes frosted due to sand erosion. The maximum distilled water production for a 3 effect version has been estimated to be about 3 gallons/m$^2$/day for practical designs, with average production of up to 2 gallons/m$^2$/day. This is about 2.5 times the production of a good single effect system. More than 3 effects can be used, but eventually the lower transmission and higher temperatures will limit the maximum number. It is thought that at least 5 effects can be used effectively, where collector area is a major consideration.

Use of glass for the present designs would result in a heavy and fragile structure. The preferred choice is plastic materials. However this presents some special problems for feeding and draining the surfaces properly due to the poor wetting properties of plastic. These problems are eliminated in the present approach. Materials currently commercially available would allow simple and long lived structures to be made. In particular, UV protected polycarbonate can be easily extruded, is strong and light, and can be used for prolonged times in sunlight at the expected maximum temperature. This material is presently made in single and multi-walled sheets and is used for skylights in homes and greenhouses, and lasts for 10 to 20 years.

The main requirements needed to obtain a practical and efficient system with the present approach are: 1) Minimize energy losses; 2) Supply the source water uniformly and controllably; 3) Collect undistilled feed water and distilled water efficiently; and 4) Make a structure that is practical to manufacture.

The first task can be accomplished by insulating water lines and containers, and recirculating the unevaporated feed water supply, to minimize heating excess water (some excess feed water has to be used to carry off concentrated salts and solid residue) The second task uses water pumped through small supply holes feeding narrow water guides to direct the supply water flow. In addition, surfactants are added to make the supply water wet the plastic and minimize deposition of particles. The third and fourth tasks will be discussed next, where two possible versions of structures are described.

One form of present invention uses a monolithic extruded structure as a main component. Four partitions and three effect chambers (layers) are preferred in this embodiment. The effect chambers are held apart by vertical walls which run the entire length of the structure, and which are laterally about 1.7 inches apart. Small (laser drilled) feed holes through the floor of the source guides, or an end mounted chamber with feed holes drips water separately onto each of the inclined source guides. The overall structure is tilted slightly to the side as well as down so that the distilled water condensing on the top of each effect chamber drains at an angle toward the collector guides side, and then drains down the vertical wall into the collectors. At the exit end of the collector guides, plugs and drain lines remove the distilled water, while the excess supply runoff is caught in an end chamber and reused.

A different design uses discrete components that can be used to make a multiple effect system. The structure is somewhat similar to the previous version in that it has source water guides (6 to the inch laterally). It also has taller ribs every inch laterally which are used as spacers in the structure.

The present invention has a hole configuration in which the source water is fed through small holes into each guide. Occasional vent holes allow trapped air to exhaust from the supply volume. When the vent air is gone, some excess water is released into the guides, but this is all recovered later. An alternate design might use a source assembly above the surfaces with short fingers lying in each guide, and with a small hole in the bottom of each finger.

A drain system includes cross drain strips, which are inclined at a small angle, and go from the right edge of the distillation system to a short distance from the left edge. They are placed about 15 inches apart longitudinally. This longitudinal separation was found experimentally to be a reasonable distance to prevent drops from becoming too large and dropping off the wall due to the poor wetting action. The cross drain strips are bonded to the bottom of each partition except the lowest, and the combined height of the drain strips and the vertical spacer ribs sets the spacing between the partitions. The stack of partitions with feed strips is held together with side and end extrusions that are just slid on, but otherwise not attached, so that different level partitions can expand different amounts without curving or buckling the structure. The drops condensing on the upper surfaces of each effect chamber drain into the cross feed strips and drain off the left end into a 1 inch wide feed strip (within two taller ribs) which drains at the left bottom. A 1-inch wide strip next to the distilled water drain strip is not fed source water, and a deep notch is cut into this strip to separate excess feed water from the distilled water. A catch basin with a partition now separately collects the source runoff and the distilled water.

This last design has the additional advantage of being able to be made into different numbers of effects if desired. It also allows the system to be disassembled to clean or replace bad portions.

There are many possible uses for a solar distillation system with the features of the present approach. The relative compactness and high productivity make it ideal for producing a small quantity of pure cooking and drinking water for a home. The lightness and simplicity of use make it ideal for a temporary or portable use system.

The present invention can easily be adapted to create a method for managing a partially, or even a fully self-contained home water supply system using an array of panels. Eighteen inches of water per year collected on a 1,200 square foot home area averages 40 gallons per day. This can be simply collected with a roof drain system and a storage tank. Rain generally produces this much or more except in desert areas. In order to average producing 140 gallons/day of solar distillations, you would need about 700 square feet of panels mounted on a south-facing roof (in the Northern Hemisphere). This is half of a 1200 square foot home area at a slant angle of 30 degrees. The supply water is a combination of rainwater collected from the roof and recaptured cooking and wash water. Flush water is lost (it can go to a septic tank in a fully independent system), but the rainwater replaces the loss. The distilled water comes out warm, so heating costs can also be reduced. It is thought the economics and convenience of such an approach would be particularly attractive in some regions of limited pure water supply.

It is thought that the thermal gradient driven regeneration multiple effect system described has design features that have not been used for any previous version of solar water purification system. The solar distillation system can also be used to distill other liquids compatible with the structure such as ethyl alcohol. In addition to distillation, the products come out hot. Another variation would use solar panels as the dark surface at the bottom of the system. The solar cells would convert part of the energy to electrical power, while the thermal heating would still be used for distillation.

Further objects, features and advantages of the invention will become apparent from a consideration of the following description and the appended claims when taken in connection with the accompanying drawings.

DETAILED DESCRIPTION OF THE PREFERRED EMBODIMENT

The following discussion directed to a solar distillation system is merely exemplary in nature, and is in no way intended to limit the invention or its applications or uses.

Figure 1:
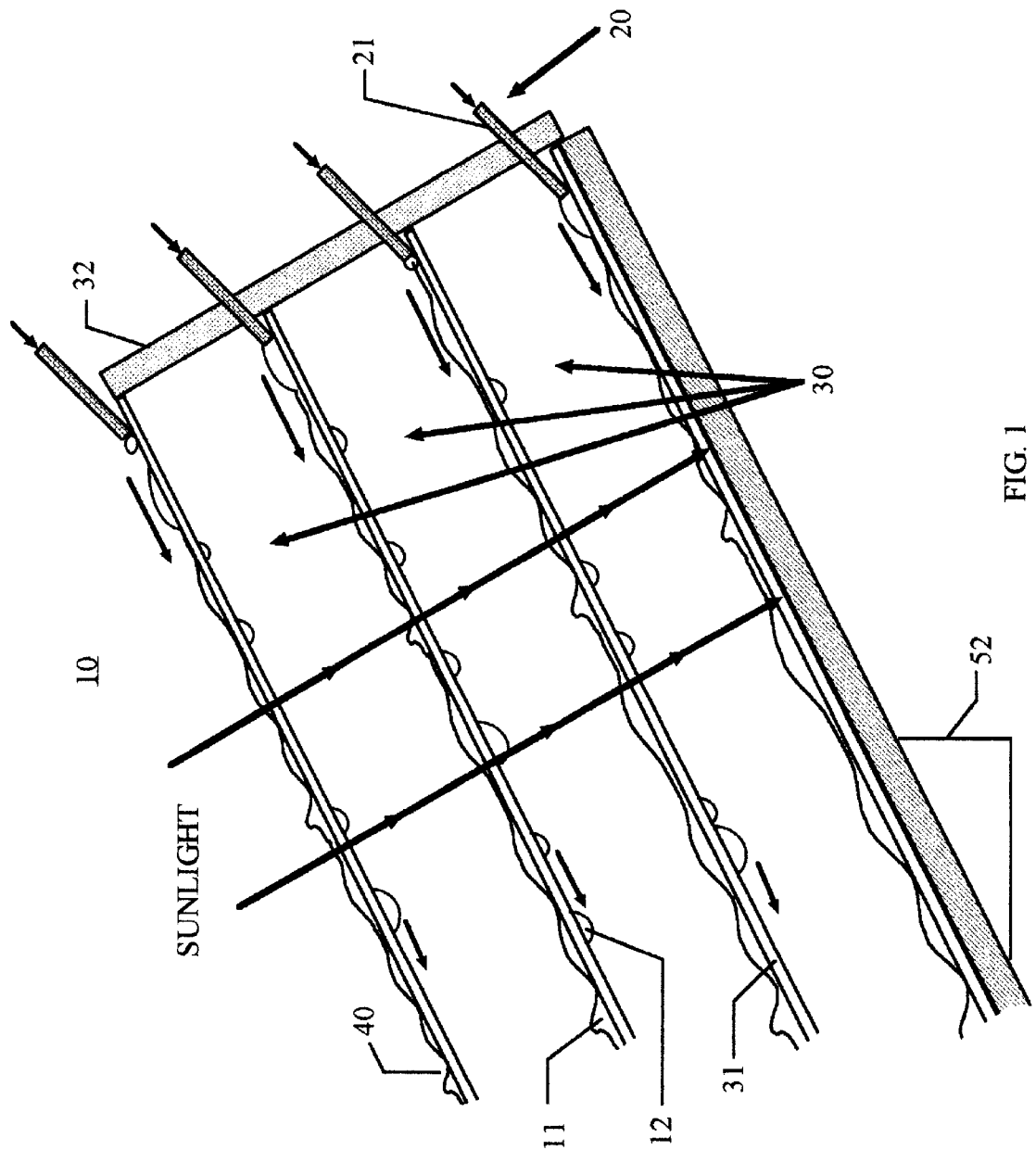
FIG. 1 is a side view of a solar distillation system of the present invention.
Figure 2:
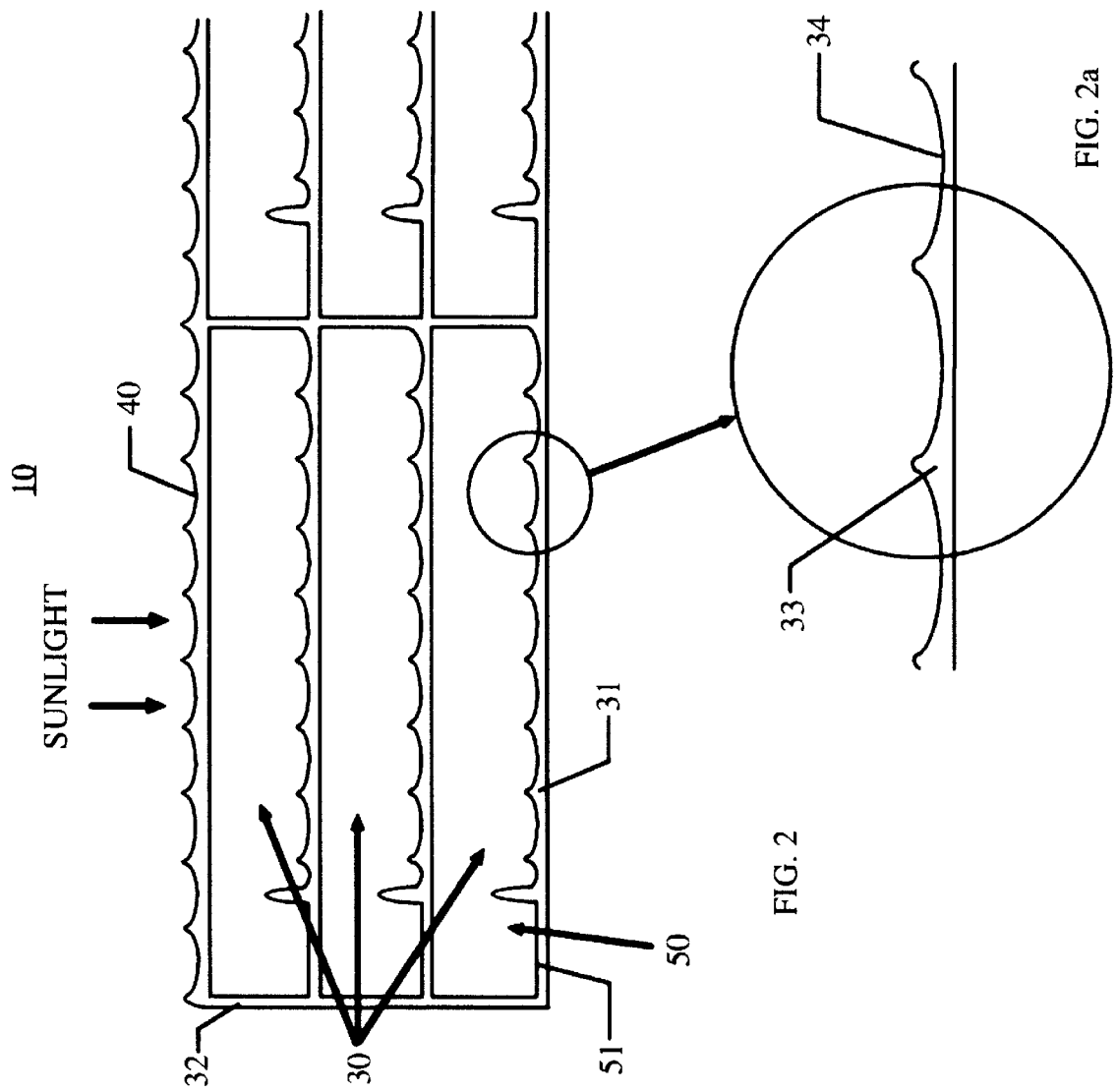
FIG. 2 is an end view of a solar distillation system of the present invention with a monolithic structure.

Turning now to FIGS. 1 and 2, a solar distillation system, indicated generally as 10, according to the invention, includes a fluid feed system 20, a plurality of effect chambers 30, a fluid drain system 50, and a front cooling mechanism 40. The fluid feed system includes a plurality of insulated fluid lines 21, and a feed hole configuration (shown in later figures).

Each effect chamber 30 includes a source fluid guide sheet 31 and a plurality of vertical walls 32 separating each effect chamber 30 from adjacent effect chambers and running the entire length of the distillation system 10. The embodiment shown in FIG. 2 involves a distillation system in which each source fluid guide sheet 31 and the plurality of vertical walls 32 comprise a monolithic structure. Ideally, the monolithic structure is made up of UV protected polycarbonate. In this embodiment, each source fluid guide sheet 31 includes a plurality of peaks and valleys having a distance between each peak of about 0.167 inches, each peak having a height above the bottom of the sheet of about 0.055 inches. Each source fluid guide sheet 31 also includes a plurality of valleys 34 disposed between each peak, each valley having a height above the bottom of the sheet of about 0.025 inches.

The drain system 50 includes a plurality of distilled fluid collector guides 51, and a tilt means 52.

In operation, the fluid feed system 20 collects and adds surfactant to source fluid 11, then sends it into the effects chambers 30 lower surfaces. The plurality of effect chambers 30 expose the source fluid 11 to evaporate from the lower surface and condense into distilled fluid 12 on the upper surfaces of the effects chambers 30. The fluid drain system 50 separates the distilled fluid 12 from the source fluid 11, while the front cooling mechanism 40 removes external energy from the distillation system 10 by evaporation, convection, and radiation. The plurality of insulated fluid lines 21 direct the source fluid 11 to each of the solar flux effects and a hole configuration guides the source fluid 11 from each plurality of fluid lines 21 while creating a distribution of the source fluid 11. This distribution allows the source fluid 11 to be distilled uniformly and controllably.

Each source fluid guide sheet 31 directs the source fluid 11 along uniform channels at the bottom surface of each effect chamber 30. Preferably, each vertical wall 32 is disposed about 1.7 inches apart.

Figure 3:
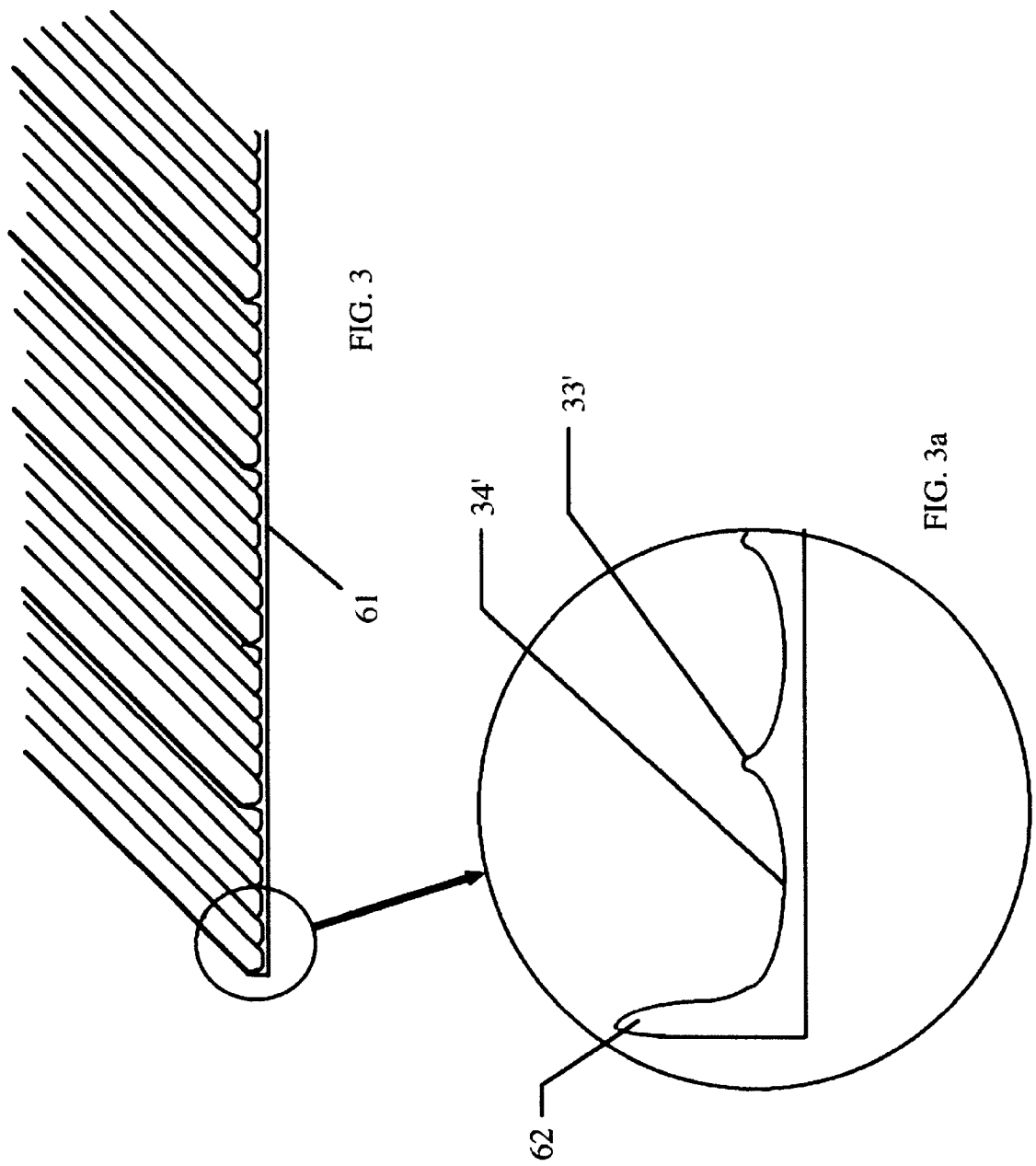
FIG. 3 is an oblique end view of an individual panel for the solar distillation system of the present invention with a discrete component structure.
Figure 4:
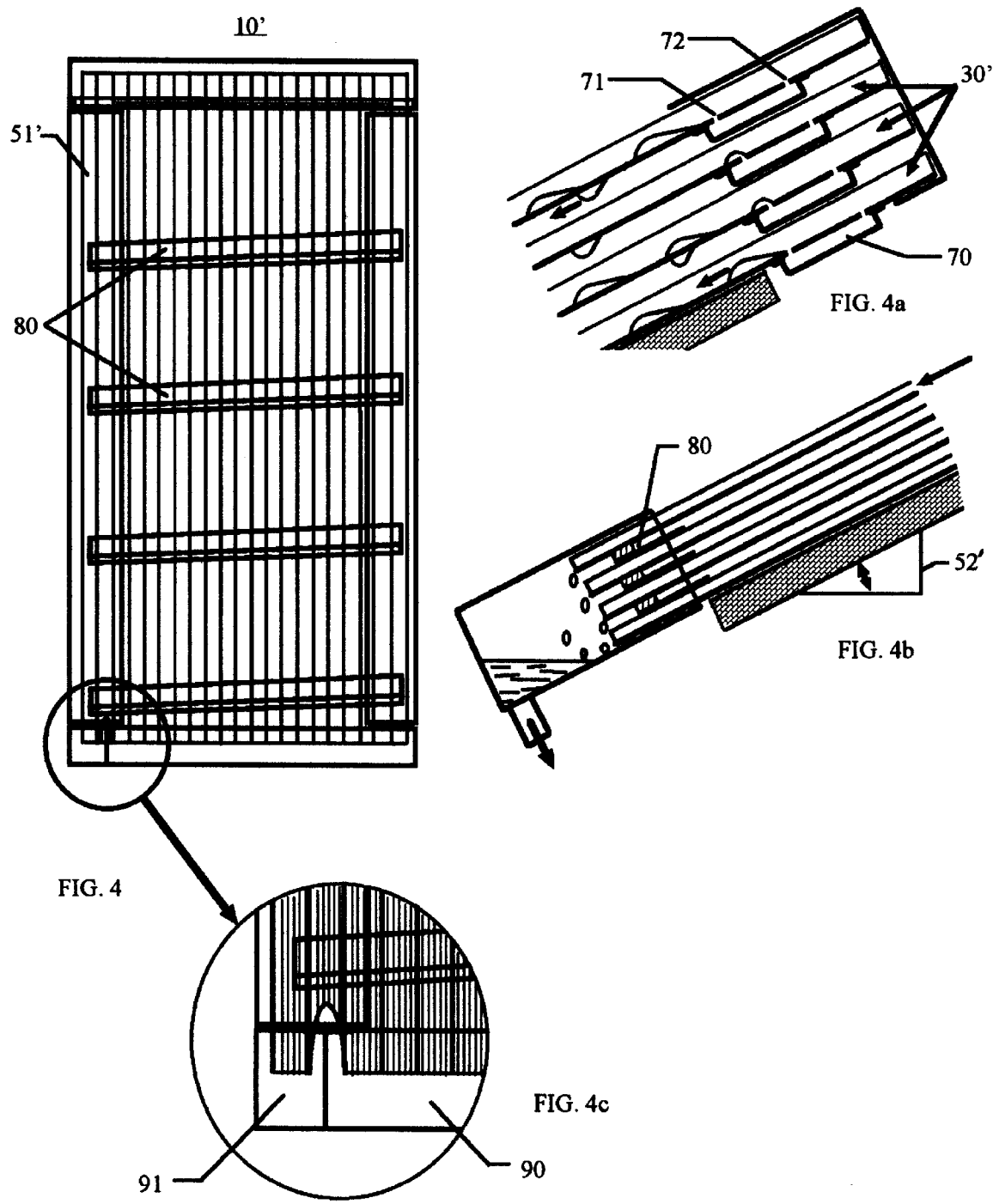
FIG. 4a is a side view of a hole (for water input) configuration of the present invention with end mounted chambers.
FIG. 4b is a side view of a drain collection system of the present invention.
FIG. 4c is an exploded top view of a drain collection system of the present invention.

Another embodiment is shown in FIGS. 3 and 4 that reduces the complexity of extrusion and the tendency to curve or buckle in high temperature gradients accompanying the above embodiment.

The primary difference with this embodiment is that each source fluid guide sheet 61 in the assembly 10' is a discrete component, wherein each discrete component 61 is also preferably made of UV protected polycarbonate. Each discrete component 61 includes a plurality of guide peaks 33' having a distance between each guide peak 33' of about 0.167 inches, each guide peak 33' having a height above the bottom of the sheet of about 0.055 inches. Each discrete component 61 also includes a plurality of spacer peaks 62 having a distance between each spacer peak 62 of about 1 inch, each spacer peak 62 having a height above the bottom of the sheet of about 0.145 inches and an average width of about 0.025 inches. Furthermore, each discrete component 61 includes a plurality of valleys 34' disposed between each peak, each valley 34' having a height above the bottom the sheet of about 0.025 inches.

As best shown in FIG. 4a, this embodiment also employs a hole configuration that includes a plurality of end mounted chambers 70 disposed along the bottom surface of the top end of each effect chamber 30'. The hole configuration also includes a plurality of feed holes 71 located within each end-mounted chamber 70, each feed hole 71 having a diameter of about 0.008 inches. The hole configuration further includes a plurality of vent holes 72 disposed adjacent to the plurality of feed holes 71, the vent holes 72 having a ratio to the plurality of feed holes 71 of about 1 to 17, each vent hole 72 having a diameter of about 0.008 inches.

Another embodiment of the hole configuration includes a plurality of fingers (not shown) positioned above the bottom surface of each effect chamber 30', and a plurality of finger feed holes (not shown) located in a bottom surface of each finger. The fingers individually supply source fluid to each valley 34' in the source fluid guide sheet. The finger feed holes may also have a diameter of about 0.008 inches.

As best seen in FIGS. 4b and 4c, this embodiment of the distillation system 10 further includes a plurality of cross drain strips 80 bonded to the top surface of each effect chamber 30'. The cross drain strips 80 direct the distilled fluid 12 to an edge of the fluid distillation system 10 and are preferably spaced about 15 inches apart and directed at a slight angle downward to properly drain into the distilled fluid catch basin 91.

The drain system 50' includes a source fluid runoff 90, a distilled fluid chamber 91 located at a collection corner of the distillation system 10', a plurality of distilled fluid collector guides 51', and a tilt means 52'. The source fluid runoff collects the source fluid 11 in collector 90, and recirculates the source fluid 11 through the distillation system 10, while the distilled fluid chamber collects the distilled fluid 12 in chamber 91. The tilt mechanism 52 holds the distillation system 10 at an angle toward the collection corner such that gravitational forces direct the distilled fluid 12 to the collection corner.

Figure 5:
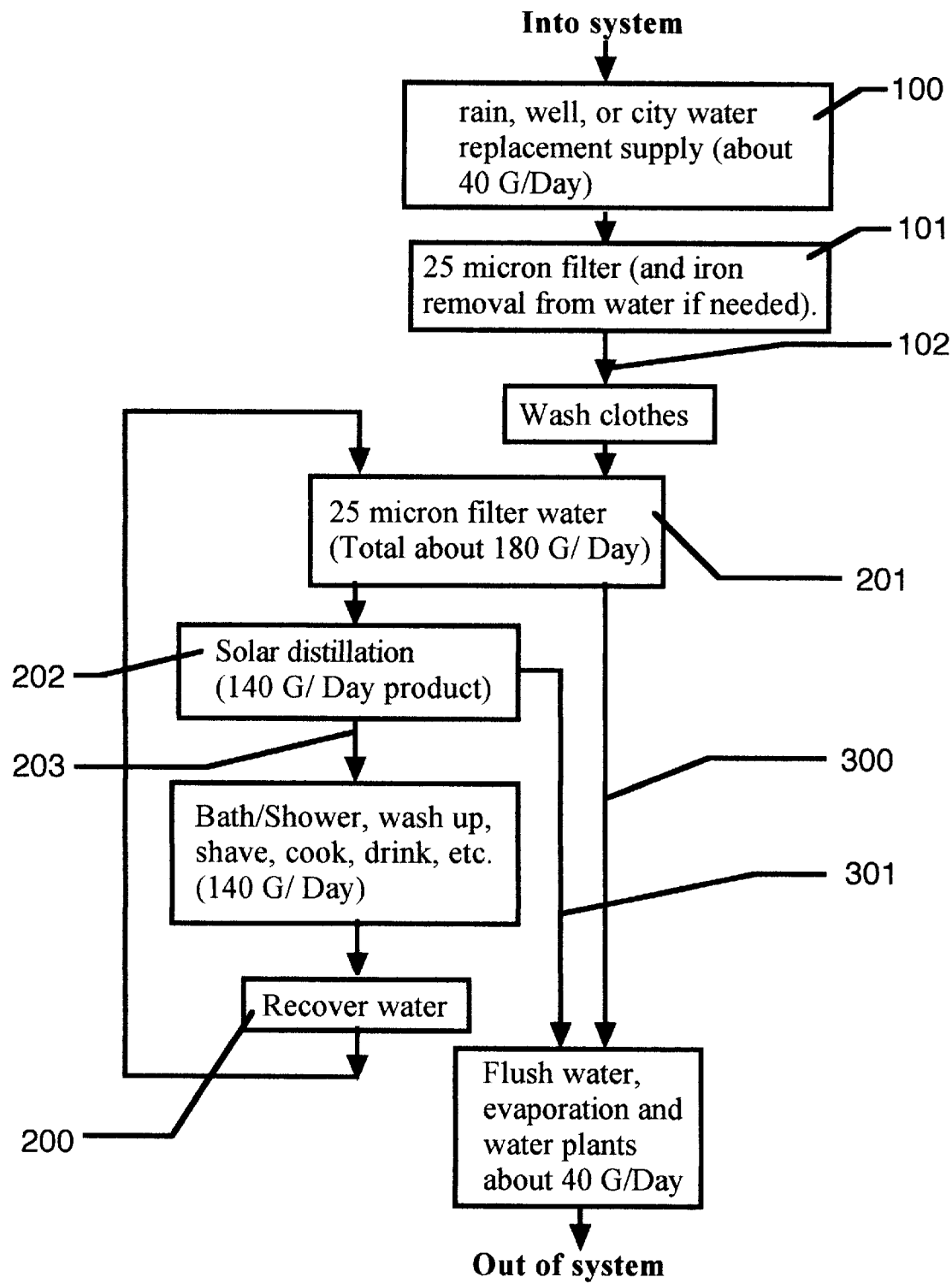
FIG. 5 is a flowchart of a method for managing home water supply in accordance with the present invention.

The fluid distillation systems 10 or 10' of the present invention can be used to manage home water supply as shown in FIG. 5. One version would includes the steps of supplying less critical clean water use such as clothes washing operations with about 40 gallons per day of external water, supplying critical clean water operations with about 140 gallons per day of distilled water, and supplying disposable water operations with about 40 gallons per day. Clean water operations include bathing, showering, washing up, shaving, cooking, drinking, etc. Disposable water operations might include toilet flush operations, evaporation cooling losses in the distillation process, and plant watering.

The step of supplying less critical clean water operations includes the steps of collecting about 40 gallons per day of external rain water 100, filtering this external water 101 from the collecting step 100, and routing the external water 102 from the filtering step 101 to clothes washing or other less critical clean water use.

The step of supplying critical clean water operations includes the steps of recovering about 140 gallons per day of recirculation water 200 from clean water operations, along with the 40 gallons collected after less critical use. This total of 180 gallons is now filtered 201 and used as the source for solar distillation 202 and also as the primary source of disposable water 300.

The step of supplying disposable water operations includes the steps of routing a total of about 40 gallons per day of water, part from the waste product of solar distillation 301, and the remainder from filtering step 300.

It is to be understood that the invention is not limited to the exact construction illustrated and described above, but that various changes and modifications may be made without departing from the spirit and scope of the invention as defined in the following claims.

What is claimed is:

1. A solar distillation system comprising:
a fluid feed system for collecting source fluid and adding surfactant to said source fluid;
a plurality of effect chambers for exposing said source fluid to a plurality of solar flux effects to effect evaporation of said source fluid and condensation of evaporated source fluid into distilled fluid;
a fluid drain system for separating said distilled fluid from said source fluid; and
a front cooling mechanism for removing external energy from said solar distillation system by evaporation, convection, and radiation;
said fluid feed system comprising a plurality of insulated fluid lines for directing said source fluid to each of said plurality of solar flux effects, and means for guiding said source fluid from each of said plurality of insulated fluid lines to separate guide channels and creating a mass reduction in said source fluid;
said means for guiding said source fluid from each of said plurality of insulated fluid lines to said separate guide channels comprising a plurality of end mounted chambers disposed along a bottom surface of the top end of each said effect chamber, each of said end mounted chambers having a plurality of feed holes located therein each said feed hole having a diameter of about 0.008 inches and lying in a valley of each said separate guide channels along with a plurality of vent holes disposed adjacent to said plurality of feed holes, said plurality of vent holes having a ratio to said plurality of feed holes of about 1 to 17, each said vent hole having a diameter of about 0.008 inches.

2. The solar distillation system of claim 1, wherein said means for guiding said source fluid from each of said plurality of insulated fluid lines to said separate guide channels further comprises:
a plurality of fingers positioned above a bottom surface of each said guide channels; and
a plurality of finger feed holes located within a bottom surface of each said fingers.

3. The solar distillation system according to claim 1, wherein each said effect chamber comprises:
a source fluid guide sheet for directing said source fluid along uniform guide channels at a bottom surface of each said effect chamber; and
a plurality of vertical walls separating each said effect chamber from adjacent effect chambers and running an entire length of said distillation system.

4. The solar distillation system according to claim 3, wherein said source fluid guide sheet and said plurality of vertical walls comprise a monolithic structure, said monolithic structure comprising UV protected polycarbonate.

5. The solar distillation system according to claim 3, wherein said source fluid guide sheet comprises a plurality of discrete sheet components, each said discrete sheet component comprising a sheet of UV protected polycarbonate.

6. The solar distillation system according to claim 5, wherein said source fluid guide sheet comprises:
a plurality of peaks having a distance between each peak of about 0.167 inches, each peak having a height of about 0.055 inches above the lower wall of the sheet; and
a plurality of valleys disposed between each peak, each valley having a height of about 0.025 inches above the lower wall of the sheet.

7. The solar distillation system according to claim 5, wherein each said discrete sheet component comprising:
a plurality of guide peaks having a distance between each guide peak of about 0.167 inches, each guide peak having a height of about 0.055 inches above the lower wall of the sheet;

a plurality of spacer peaks having a distance between each peak of about 1 inch, each spacer peak having a height of about 0.145 inches above the lower wall of the sheet and average width of about 0.025 inches; and a plurality of valleys disposed between each peak, each valley having a height of about 0.025 inches above the lower wall of the sheet.

8. The solar distillation system according to claim 1, wherein said fluid drain system comprises:

a source fluid runoff chamber for collecting said source fluid and recirculating said source fluid through said distillation system;

a distilled fluid chamber located at a collection corner of said distillation system for collecting said distilled fluid;

a plurality of distilled fluid collector guides for directing said distilled water to said distilled fluid chamber; and a tilt means for holding said distillation system at an angle toward said collection corner so that gravitational forces direct said distilled fluid to said distilled fluid collection guides.

9. The solar distillation system according to claim 8, further comprising a plurality of cross drain strips bonded to a top surface of each said effect chamber for directing said distilled fluid to an edge of said solar distillation system.

10. The solar distillation system according to claim 1, wherein said plurality of effect chambers comprises three effect chambers.

\* \* \* \* \*